Oct. 29, 1940.  E. GOSSEL  2,219,922

RADIO TRANSMITTING AND RECEIVING SYSTEM

Filed Feb. 23, 1938

Inventor:
Erich Gossel
by R. C. Hopgood
Attorney

Patented Oct. 29, 1940

2,219,922

UNITED STATES PATENT OFFICE 2,219,922

RADIO TRANSMITTING AND RECEIVING SYSTEM

Erich Gossel, Berlin, Germany, assignor to C. Lorenz Aktiengesellschaft, Berlin-Tempelhof, Germany, a company Application February 23, 1938, Serial No. 192,103
In Germany February 22, 1937

6 Claims. (Cl. 250—13)

(Granted under the provisions of sec. 14, act of March 2, 1927; 357 O. G. 5)

The present invention relates to radio systems for intermittently transmitting and receiving high frequency oscillations, preferably ultra short waves.

It is well known in two-way transmission and reception of high frequency oscillations to employ means for disconnecting either the receiving equipment during transmission, or the transmitting equipment during reception. Under certain operating conditions, particularly in connection with a single antenna system, the disadvantage prevails that the transmitting equipment absorbs energy from the electrical waves with the result that the energy supply to the receiving equipment decreases.

The present invention consists in certain features of novelty which will appear from the following description and be pointed out in the appended claims, reference being made to the accompanying drawing, in which—

Figure 1:
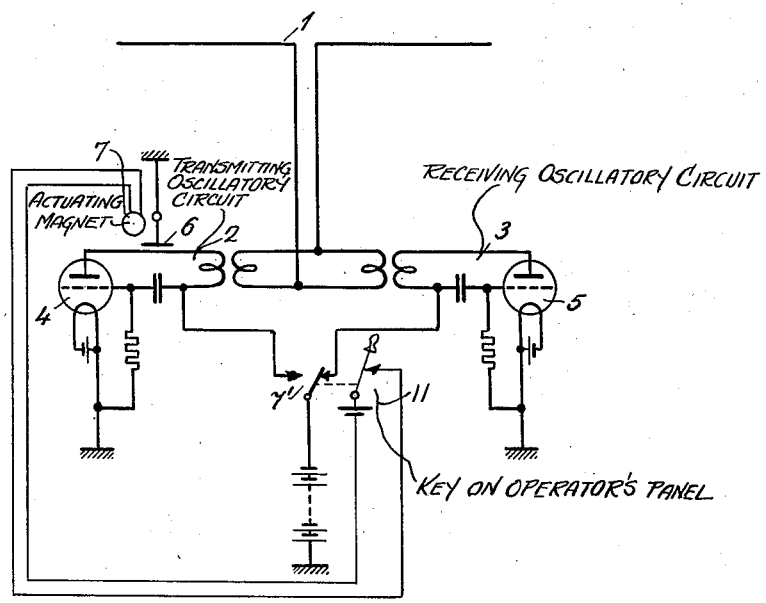
Figure 2:
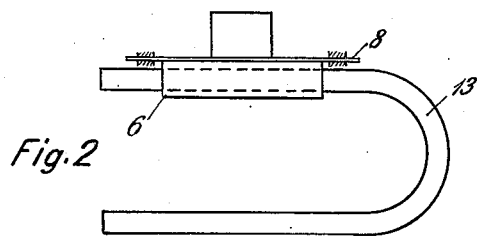
Figure 3:
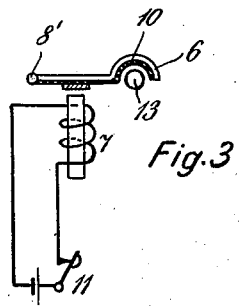

Fig. 1 schematically illustrates a wiring diagram of an arrangement for intermittent transmission and reception embodying the invention;

Fig. 2 illustrates one form of de-tuning element for realizing the invention; while Fig. 3 diagrammatically illustrates a slightly modified form of de-tuning element with magnetic means for actuating it for realizing the invention.

The arrangement illustrated in Fig. 1, for instance, shows a transmitting oscillatory circuit 2 and a receiving oscillatory circuit 3 which are coupled with a dipole 1 common thereto. These two oscillatory circuits are standard Hartley circuits, the capacities of which are formed by the inherent capacities of the tubes 4 and 5, respectively. The energy of the oscillations received by the antenna 1 is distributed in both circuits, hence only the energy effectively received by the receiving equipment becomes active.

This disadvantage is obviated according to the present invention which provides means for de-tuning the oscillatory circuit of the transmitting circuit during reception in order to permit all energy received to be applied to the receiving equipment only. For this purpose the invention provides a swinging trough-like member which is indicated at 6 in Fig. 1 and which is simultaneously brought in close proximity to the transmission oscillatory circuit 2 by magnet 7 controlled by key 11, when the system is changed from transmission to reception. The swinging de-tuning member which is connected to ground at one end exerts in the position shown in the drawing a strong capacitive de-tuning of the circuit to which it is allotted.

Fig. 2 illustrates one embodiment of the de-tuning member which may be a strap 6 of sheet metal bent into the form of a channel of semi-circular cross section, for instance, pivotally mounted on a spindle 8 and actuated in a manner hereinafter described. In the state of transmission, the member is spaced from the inductance 13 of the oscillatory circuit, while moved in close proximity thereto in a state of reception so as to exert de-tuning of the transmitting oscillatory circuit.

Equipments utilized in ultra short wave communication are generally mounted in a box-shaped casing which is provided with an operator's panel having a key manually actuated by the operator when the system is changed from transmission to reception or vice versa, whereby the plate voltage is applied to one circuit and disconnected from the other, e. g., by the agency of contact 7' of Fig. 1.

According to a further feature of the invention, the operation of the above mentioned key simultaneously influences the de-tuning member by means of a relay. This arrangement is shown in Fig. 3. The key 11 controlling the relay 7 is mechanically coupled with the make and break contact 7' (Fig. 1), so that the de-tuning of the transmitting oscillatory circuit on account of the close proximity between its inductance 13 and the swinging member 6 simultaneously reverses the anode voltage from the transmitting to the receiving oscillatory circuit. It is obvious that the contact 7' may also be electrically controlled by relay 7. The member 6 which in this embodiment is pivotally mounted at one end on a spindle 8' is maintained at earth potential and effects a capacitive de-tuning of its allotted oscillatory circuit as soon as it is brought in close proximity to the inductance of said circuit. The inner surface of the de-tuning member is provided with an insulating layer 10 in order to prevent conductive connection to other elements of the circuit. The capacitive de-tuning thus obtained with respect to the transmitting circuit is such that no energy will be absorbed therein even if transmission and reception are effected on the same or approximately the same wavelength.

The same de-tuning of the receiving oscillatory circuit may be performed during the transmission in order to permit the entire energy of the transmitting circuit to be applied to the transmitting dipole.

What is claimed is:

1. In an arrangement for alternate transmission and reception of high frequency oscillations preferably ultra-short waves, a transmitting oscillatory circuit, a receiving oscillatory circuit, an antenna common to said oscillatory circuits, means for alternately rendering one and then the other of said oscillatory circuits operative, means for de-tuning one of said oscillatory circuits during the operation of the other of said oscillatory circuits, and means for causing both said means to operate in correspondence with each other.

2. In an arrangement for alternate transmissions and reception of high frequency oscillations preferably ultra short waves, a transmitting oscillatory circuit, a receiving oscillatory circuit, an antenna common to said oscillatory circuits, means for changing from reception to transmission, and means for de-tuning the receiving oscillatory circuit during transmission and means for causing both said means to operate in correspondence with each other.

3. In an arrangement for alternate transmission and reception of high frequency oscillations preferably ultra short waves, a transmitting oscillatory circuit, a receiving oscillatory circuit, an antenna common to said oscillatory circuits, means for changing from transmission to reception, a member for de-tuning the transmitting oscillatory circuit during reception, and means for moving said member relative to the transmitting oscillatory circuit in accordance with said means for changing from transmission to reception.

4. In an arrangement for alternate transmission and reception of high frequency oscillations according to claim 3, having a switch at an operator's panel, means controlled through said switch for simultaneously effecting the actuation of said means for changing from transmission to reception and the actuation of said means for moving said member.

5. In an arrangement for alternate transmission and reception of high frequency oscillations preferably ultra short waves, a transmitting oscillatory circuit, a receiving oscillatory circuit, an antenna common to said oscillatory circuits, means for changing from reception to transmission a member for de-tuning the receiving oscillatory circuit during transmission, and means for moving said member relative to the receiving oscillatory circuit in accordance with said means for changing from reception to transmission.

6. In an arrangement according to claim 5, a switch at an operator's panel, means controlled through said switch for simultaneously effecting the actuation of said means for changing from reception to transmission and the actuation of said means for moving said member.

ERICH GOSSEL.